Oct. 12, 1965  K. PICKLES  3,211,434
MIXING APPARATUS
Filed Nov. 12, 1963
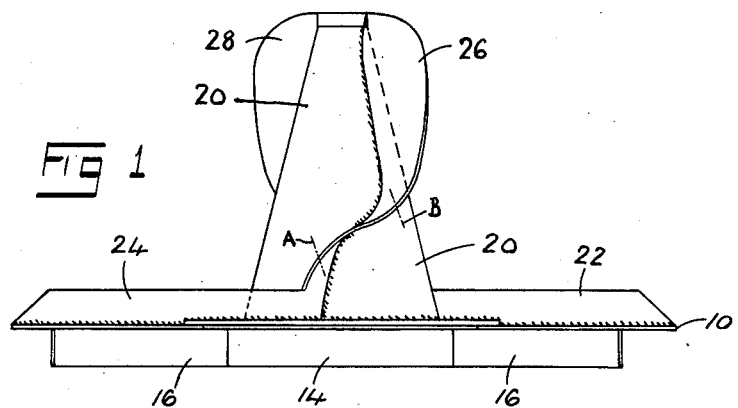
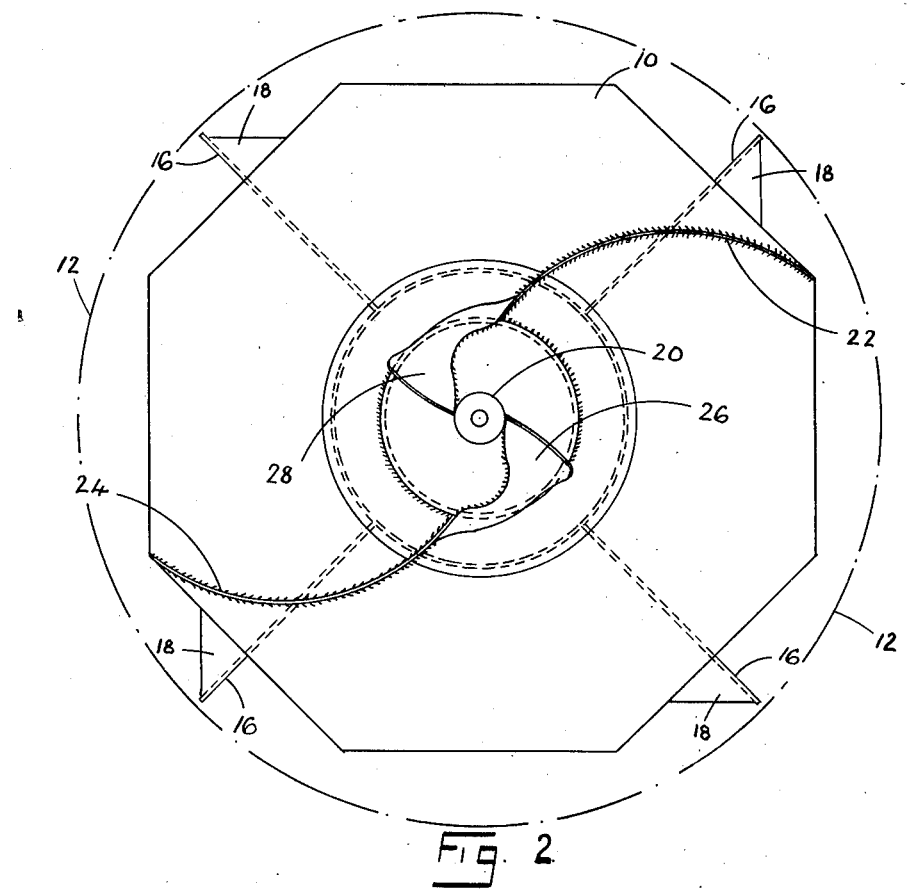
INVENTOR
KENNETH PICKLES
By: Norris & Bateman
Attorneys

United States Patent Office 3,211,434
Patented Oct. 12, 1965

3,211,434
MIXING APPARATUS
Kenneth Pickles, Burnley, England, assignor to George Tweedy & Company Limited, Chipping, near Preston, England, a corporation of Great Britain
Filed Nov. 12, 1963, Ser. No. 322,928
Claims priority, application Great Britain, Nov. 14, 1962, 43,021/62
3 Claims. (Cl. 259—134)

In the prior art there is described a rotor for a mixing, pulverising or like machine comprising an imperforate plate adapted to be mounted for rotation about a vertical axis passing substantially through the centre of the plate and at right angles thereto, the plate having two or more radially disposed blades projecting at right angles from its under surface and extending beyond the periphery of the plate.

Whilst a rotor of this type can be used for mixing powdered materials (and particularly for dough mixing) it has been found that there is sometimes a tendency for the material to rise, whereas it is important for the rotor to act properly, that the material should be kept down.

According to this invention a rotor of this kind is provided with an upstanding central column, from which there projects one or more blades, each of which has at least one portion inclined downwardly and rearwardly relatively to the direction of rotation of the rotor.

A rotor suitable for use in a dough mixing machine will now be described by way of example only, with reference to the accompanying drawings, in which:

FIGURE 1 is a side view of a rotor, and
FIGURE 2 is a plan view of the rotor shown in FIGURE 1.

The rotor comprises a plate 10 which is substantially octagonal in shape, and has a central hub for mounting the rotor on the upper end of a driving shaft within a cylindrical chamber of the mixing machine (the chamber being indicated by chain dotted lines 12). An axially short cylinder 14 is secured on the underside of the plate 10 concentric with the hub, and four radially disposed blades 16 also secured to the underside of the plate project outwardly from the cylinder 14 and beyond the octagonal periphery of the plate. Each blade projects from a position approximately midway along one of the flats of the octagon. The plate has triangular extensions or fillets 18 disposed between the projecting portions of the blades and the plate at the trailing sides of the blades in the sense of the direction of rotation of the rotor.

A conical column 20 extends upwardly from the top surface of the plate, the column being concentric with the axis of rotation of the rotor, and the base of the column having a diameter approximately one quarter the distance across the flats of the octagon. Two top blades 22 and 24 are provided on the top surface of the plate, these top blades being arranged diametrically opposite each other, and each extending from the column to the periphery of the plate. Each top blade is curved in plan view, and joins the foot of the column in a radial plane which is just in advance of a corner of the hexagon immediately in front of one of the radial blades 16 on the underside of the plate, and reaches the periphery of the plate at the corner immediately to the rear of that radial blade.

A pair of scroll blades 26 and 28 are also provided fixed to the column. Each scroll blade is substantially helical and at its lower end blends into one of the top blades 22 and 24. The angle of the helix alters, however, so that one portion of each scroll blade (between the positions marked A and B in FIGURE 1) has only a small helix angle, and the parts on each side of this portion have much larger helix angles. The direction of inclination of each scroll blade is such that, as the rotor rotates, material on the blade is pressed downwardly by the scroll blades. In particular, the portions of small helix angle help to compact material on the plate.

I claim:

1. A rotor for mixing pulverising or like machines comprising an imperforate plate adapted for rotation about a vertical axis passing substantially through the centre of the plate and at right angles thereto, said plate having a plurality of radially disposed blades projecting at right angles from the underside of said plate, each of said blades extending beyond the periphery of said plate, an upstanding column central on said plate and a scroll blade projecting from said column said scroll blade having at least one portion inclined downwardly and rearwardly relatively to the direction of rotation of said rotor.

2. A rotor for mixing pulverising or like machines according to claim 1, comprising a top blade extending from the bottom of said scroll blade on the top side of said plate to the periphery of said plate, said top blade being curved in plan view.

3. A rotor for mixing pulverising or like machines comprising an imperforate plate adapted for rotation about a vertical axis passing substantially through the centre of the plate and at right angles thereto, said plate having a plurality of radially disposed blades projecting at right angles from the underside of said plate, each of said blades extending beyond the periphery of said plate, an upstanding column central on said plate and a plurality of scroll blades projecting from said column, each of said scroll blades having at least one portion inclined downwardly and rearwardly relatively to the direction of rotation of said rotor.

References Cited by the Examiner
UNITED STATES PATENTS
2,140,866   12/38   Whyte _____ 68—131
FOREIGN PATENTS
824,333   12/51   Germany.

WALTER A. SCHEEL, Primary Examiner.